US012518333B2

(12) United States Patent
Molina

(10) Patent No.: US 12,518,333 B2
(45) Date of Patent: Jan. 6, 2026

(54) FORENSIC CRIMINAL INVESTIGATION STORYBOARD

(71) Applicant: Nighthawk.cloud, Inc., Aurora, CO (US)

(72) Inventor: Peter R. Molina, Lakewood, CO (US)

(73) Assignee: LEADSONLINE, LLC, Plano, TX (US)

( * ) Notice: Subject to any disclaimer, the term of this patent is extended or adjusted under 35 U.S.C. 154(b) by 229 days.

(21) Appl. No.: 18/321,771

(22) Filed: May 23, 2023

(65) Prior Publication Data

US 2024/0394819 A1  Nov. 28, 2024

(51) Int. Cl.
*G06Q 50/26* (2024.01)
*G06F 16/9535* (2019.01)
*G06F 16/9538* (2019.01)
*G06Q 50/00* (2024.01)

(52) U.S. Cl.
CPC ....... *G06Q 50/265* (2013.01); *G06F 16/9535* (2019.01); *G06F 16/9538* (2019.01); *G06Q 50/01* (2013.01)

(58) Field of Classification Search
CPC .. G06Q 50/01; G06Q 50/265; G06F 16/9535; G06F 16/9538
See application file for complete search history.

(56) References Cited

U.S. PATENT DOCUMENTS

| | | | | |
|---|---|---|---|---|
| 11,669,512 B1* | 6/2023 | Smith | .................... | G06Q 50/26 707/690 |
| 2004/0093349 A1* | 5/2004 | Buinevicius | ........... | G06Q 10/00 |
| 2011/0295886 A1* | 12/2011 | Bousquet | ............... | G06Q 50/18 707/E17.069 |
| 2015/0324107 A1* | 11/2015 | Van Dijkman | ..... | G06F 3/04845 715/719 |
| 2021/0350141 A1* | 11/2021 | Janakiraman | .......... | G06V 20/41 |

OTHER PUBLICATIONS

Ieong, Ricci SC. "FORZA-Digital forensics investigation framework that incorporate legal issues." digital investigation 3 (2006): 29-36. (Year: 2006).*

* cited by examiner

*Primary Examiner* — Jay A Morrison

(57) ABSTRACT

Systems and methods for producing a forensic storyboard that includes visual details of a criminal case. A forensic storyboard may be created from data within a forensic database. The forensic storyboard may be provided to a user through an interactive database. A user may be able to revise the forensic storyboard through the interactive webpage. A forensic storyboard may be output to a standalone file. A forensic storyboard may be used by an investigator to communicate details of a forensic investigation to superiors, colleagues, partners, other agencies, prosecutors, or judges.

41 Claims, 11 Drawing Sheets

| ID | Type | Data Set | Start Time | End Time | Duration | Sender | Reciever | Location |
|---|---|---|---|---|---|---|---|---|
| 445 | Call | First | 4/11/14 22:15 | 4/11/14 22:18 | 3 mins | First user | Second user | |
| 322 | Message | Second | 4/10/14 23:33 | 4/10/14 23:34 | 6 s | Second user | First user | |
| 13 | License plate | LP Reader | 4/11/14 22:13 | | | | | 39.740209,-104.865939 |

FIG. 9

FORENSIC CRIMINAL INVESTIGATION STORYBOARD

BACKGROUND

Modern forensic criminal investigation techniques often use cell phone data and/or other digital data to track a person of interest's activity and/or to determine whom a person of interest has interacted. Digital interaction records can come from a variety of sources, have a different data structures, include different data, etc. In addition, communication about forensic investigations can be difficult due to the amount and complexity of evidence.

SUMMARY

A computing cloud for forensic criminal investigation is disclosed. The computing cloud, for example, may include at least one data storage unit and at least one memory device configured to store instructions and at least one computer processing unit that executes the instructions. The computing cloud, for example, provides an interactive webpage having at least data management page and storyboard page. The computing cloud, for example, may receive first personal data about a first subject via the data management page, wherein the first personal data; receives a first image via the data management page; receive first text data associated with the first image via the data management page; and/or receive first time data associated with the first image via the data management page. The computing cloud, for example, may link the first time data and the first text data with the first image. The computing cloud, for example, may receive second text data via the data management page, may receive first location data via the data management page; and/or may receive second time data via the data management page. The computing cloud, for example, may link the first location data and the second time data with the second text data. The computing cloud, for example, may receive a first plurality of digital records of interaction between a first identifier associated with the first subject and a first plurality of identifiers each associated with a respective one of a first plurality of individuals, the first plurality of digital records having been recorded by a first provider, each of the first plurality of digital records including a plurality of data elements. The computing cloud, for example, may receive a first map from a network location from the location data, the first map showing the first location and an area surrounding the first location, the first map having a graphical representation of the first location. The computing cloud, for example, may create a plurality of story boards on the storyboard page, each storyboard of the plurality of storyboards comprising graphical and/or textual representations of data. The plurality of storyboards may include a first storyboard that includes the first personal data, a reference to the first plurality of records, and a timeline, the timeline comprising a visual representation of the first time data and a visual representation of the second time data; a second storyboard that includes the first image, the first text, the first time data, and the timeline; and/or a third storyboard that includes the second text, the second time location, the first map, and the timeline. The computing cloud, for example, may provide the storyboard on the interactive webpage in response to a request for the interactive webpage.

The first provider, for example, may include a provider selected from the group consisting of a wireless communication provider, a social media company, and a messenger company.

The data management page, for example, may include one or more pages.

The visual representation of the first time data, for example, may include a link to the second story board such that when clicked by a user viewing either the first story board or the third story board the second story board is presented to the user.

The computing cloud may, for example, receive second personal data about a second subject via the data management page. The plurality of storyboards, for example, may include a fourth storyboard that includes the second personal data.

The computing cloud may receive a second plurality of digital records of interaction between a second identifier associated with the second subject and a second plurality of identifiers each associated with a respective one of a second plurality of individuals, the second plurality of digital records having been recorded by a second provider, each of the second plurality of digital records including a plurality of data elements. The fourth storyboard may include a reference to the second plurality of records.

The computing cloud, for example, may establish a first digital interaction between the first subject and the second subject based on an interaction between the data element of the first plurality of digital records and the data element of the second plurality of digital record.

The computing cloud may receive changes to one or more of the first text data, the first time data, the first location data, the second text data, and the second time data; and/or automatically updates the plurality of storyboards based on the changes.

The computing cloud, for example, may receive third data via the data management page; receive third time data via the data management page; link the third data and the third time data together; update the timeline to include a representation of the third time data; and/or update the plurality of storyboards to include a fourth storyboard that includes a visual and/or textural representation of the third data.

The computing cloud may, for example, export the case slides as a standalone file, the standalone file comprising a file selected from the group consisting of a pdf file, an HTML file, and a power point file.

Systems and methods are disclosed for producing a storyboard of a forensic case. A method, for example, may include providing an interactive webpage having at least data management page and storyboard page. The method may also include receiving first personal data about a first subject via the data management page, wherein the first personal data; receiving a first image via the data management page; receiving first text data associated with the first image via the data management page; and receiving first time data associated with the first image via the data management page. The method may link the first time data and the first text data with the first image. The method may also include receiving second text data via the data management page; receiving first location data via the data management page; and receiving second time data via the data management page. The method may link the first location data and the second time data with the second text data. The method may receive a first plurality of digital records of interaction between a first identifier associated with the first subject and a first plurality of identifiers each associated with a respective one of a first plurality of individuals, the first plurality of digital records having been recorded by a first provider, each of the first plurality of digital records including a plurality of data elements. The method may retrieve a first map from a network location from the location data, the first map showing the first location and an area surrounding the first location, the first map having a graphical representation of the first location. The method may create a plurality of story boards on the storyboard page, each storyboard of the plurality of storyboards comprising graphical and/or textual representations of data. The plurality of storyboards may include: a first storyboard that includes the first personal data, a reference to the first plurality of records, and a timeline, the timeline comprising a visual representation of the first time data and a visual representation of the second time data; a second storyboard that includes the first image, the first text, the first time data, and the timeline; and a third storyboard that includes the second text, the second time location, the first map, and the timeline. The method may provide storyboard on the interactive webpage in response to a request for the interactive webpage.

The first provider, for example, may include a provider selected from the group consisting of a wireless communication provider, a social media company, and a messenger company.

The data management page, for example, may include comprises one or more pages.

The visual representation of the first time data, for example, may include a link to the second story board such that when clicked by a user viewing either the first story board or the third story board the second story board is presented to the user.

The method for example, may include receiving second personal data about a second subject via the data management page. The plurality of storyboards, for example, may include a fourth storyboard that includes the second personal data. The method for example, may include receiving a second plurality of digital records of interaction between a second identifier associated with the second subject and a second plurality of identifiers each associated with a respective one of a second plurality of individuals, the second plurality of digital records having been recorded by a second provider, each of the second plurality of digital records including a plurality of data elements. The fourth storyboard, for example, may include a reference to the second plurality of records.

The method, for example, may include establishing a first digital interaction between the first subject and the second subject based on an interaction between the data element of the first plurality of digital records and the data element of the second plurality of digital records.

The method, for example, may include receiving changes to one or more of the first text data, the first time data, the first location data, the second text data, and the second time data; and/or automatically updating the plurality of storyboards based on the changes.

The method, for example, may include receiving third data via the data management page; receiving third time data via the data management page; linking the third data and the third time data together; updating the timeline to include a representation of the third time data; and/or updating the plurality of storyboards to include a fourth storyboard that includes a visual and/or textural representation of the third data.

The method, for example, may include exporting the case slides as a standalone file, the standalone file comprising a file selected from the group consisting of a pdf file, an HTML file, and a power point file.

Systems and methods are disclosed for producing a storyboard of a forensic case. A method, for example may include providing an interactive webpage and receiving via the interactive webpage a first plurality of digital records of interaction between a first identifier associated with a first individual and a first plurality of identifiers each associated with a respective one of a first plurality of individuals. The first plurality of digital records, for example, may have been recorded by a first provider, each of the first plurality of digital records including a plurality of data elements. The method may also include receiving personal data about the first individual and receiving one or more data files associated with the first individual, the one or more data files selected from the group consisting of an image, text, video, audio, and GPS data via the interactive webpage. The method may also include creating a case by linking together the personal data about the first individual, the first plurality of digital records of interactions, and the one or more data files in a case database. The method may also include creating a plurality of case slides from the case, wherein each of the plurality of case slides include a graphical representation of the case. The method may also include modifying the interactive webpage to present the case slides.

The method may also include exporting the case slides as a standalone file, the standalone file comprising a file selected from the group consisting of a pdf file, an HTML file, and a power point file.

The plurality of case slides, for example, may include a first slide including a visual representation of the personal data about the first individual; a second slide including a visual representation of data within he one or more data files; and/or a third slide including a visual representation of the first plurality of digital records of interaction.

Each of the first plurality of digital records of interaction, for example, may include a timestamp and the one or more data files include a timestamp; and wherein each of the plurality of case slides are organized chronologically based on the timestamps.

The method may also include receiving via the interactive webpage a second plurality of digital records of interaction between a second identifier associated with a second individual and a second plurality of identifiers each associated with a respective one of a second plurality of individuals, the second plurality of digital records having been recorded by a second provider, each of the second plurality of digital records including a plurality of data elements.

For example, creating the case may include linking together the personal data about the first individual, the first plurality of digital records of interactions, the second plurality of digital records of interactions, and the one or more data files in a case database.

The plurality of case slides, for example, may include a third slide including a visual representation of the first plurality of digital records of interaction; and/or a fourth slide including a visual representation of the second plurality of digital records of interaction.

The plurality of data elements of the first plurality of digital records, for example, may be different than the plurality of data elements of the second plurality of digital records. The first provider, for example, may include a first mobile phone carrier and the second provider, for example, may include a second mobile phone carrier. The first provider, for example, may include a mobile phone carrier and the second provider, for example, may include a social media company. The first provider, for example, may include mobile phone carrier and the second provider may include a messaging company.

The first plurality of digital records may include mobile phone records, license plate data, GPS tracking data, emails, and messages.

A computing cloud for forensic criminal investigation is disclosed. The computing cloud, for example, may include at least one data storage unit and at least one memory device that stores instructions and at least one computer processing unit that executes the instructions. The computing cloud, for example, may provide an interactive webpage and receive via the interactive webpage a first plurality of digital records of interaction between a first identifier associated with a first individual and a first plurality of identifiers each associated with a respective one of a first plurality of individuals. The first plurality of digital records, for example, have been recorded by a first provider, each of the first plurality of digital records including a plurality of data elements.

The computing cloud, for example, may receive via the interactive webpage personal data about the first individual and/or receive via the interactive webpage one or more data files associated with the first individual, the one or more data files selected from the group consisting of an image, text, video, audio, and GPS data. The computing cloud, for example, may create a case by linking together the personal data about the first individual, the first plurality of digital records of interactions, and the one or more data files in a case database. The computing cloud, for example, may create a plurality of case slides from the case, wherein each of the plurality of case slides include a graphical representation of the case and/or modify the interactive webpage to present the case slides.

The computing cloud, for example, may export the case slides as a standalone file, the standalone file comprising a file selected from the group consisting of a pdf file, an HTML file, and a power point file.

the plurality of case slides, for example, may include a first slide including a visual representation of the personal data about the first individual; a second slide including a visual representation of data within he one or more data files; and/or a third slide including a visual representation of the first plurality of digital records of interaction.

Each of the first plurality of digital records of interaction, for example, may include a timestamp and the one or more data files include a timestamp; and wherein each of the plurality of case slides are organized chronologically based on the timestamps.

The computing cloud, for example, may receive via the interactive webpage a second plurality of digital records of interaction between a second identifier associated with a second individual and a second plurality of identifiers each associated with a respective one of a second plurality of individuals, the second plurality of digital records having been recorded by a second provider, each of the second plurality of digital records including a plurality of data elements. Creating the case may include linking together the personal data about the first individual, the first plurality of digital records of interactions, the second plurality of digital records of interactions, and the one or more data files in a case database.

The plurality of case slides, for example, may include a third slide including a visual representation of the first plurality of digital records of interaction; and/or a fourth slide including a visual representation of the second plurality of digital records of interaction.

The plurality of data elements of the first plurality of digital records, for example, may be different than the plurality of data elements of the second plurality of digital records. The first provider, for example, may include a first mobile phone carrier and the second provider, for example, may include a second mobile phone carrier. The first provider, for example, may include a mobile phone carrier and the second provider includes a social media company. The first provider, for example, may include a mobile phone carrier and the second provider includes a messaging company.

The first plurality of digital records, for example, may include mobile phone records, license plate data, GPS tracking data, emails, and messages.

The various embodiments described in the summary and this document are provided not to limit or define the disclosure or the scope of the claims.

BRIEF DESCRIPTION OF THE FIGURES

FIG. 9 is a graphical representation of a digital interaction between a one or more identifiers in a first plurality of identifiers and one more identifiers in a second plurality of identifiers.

DETAILED DESCRIPTION 1

Figure 1:
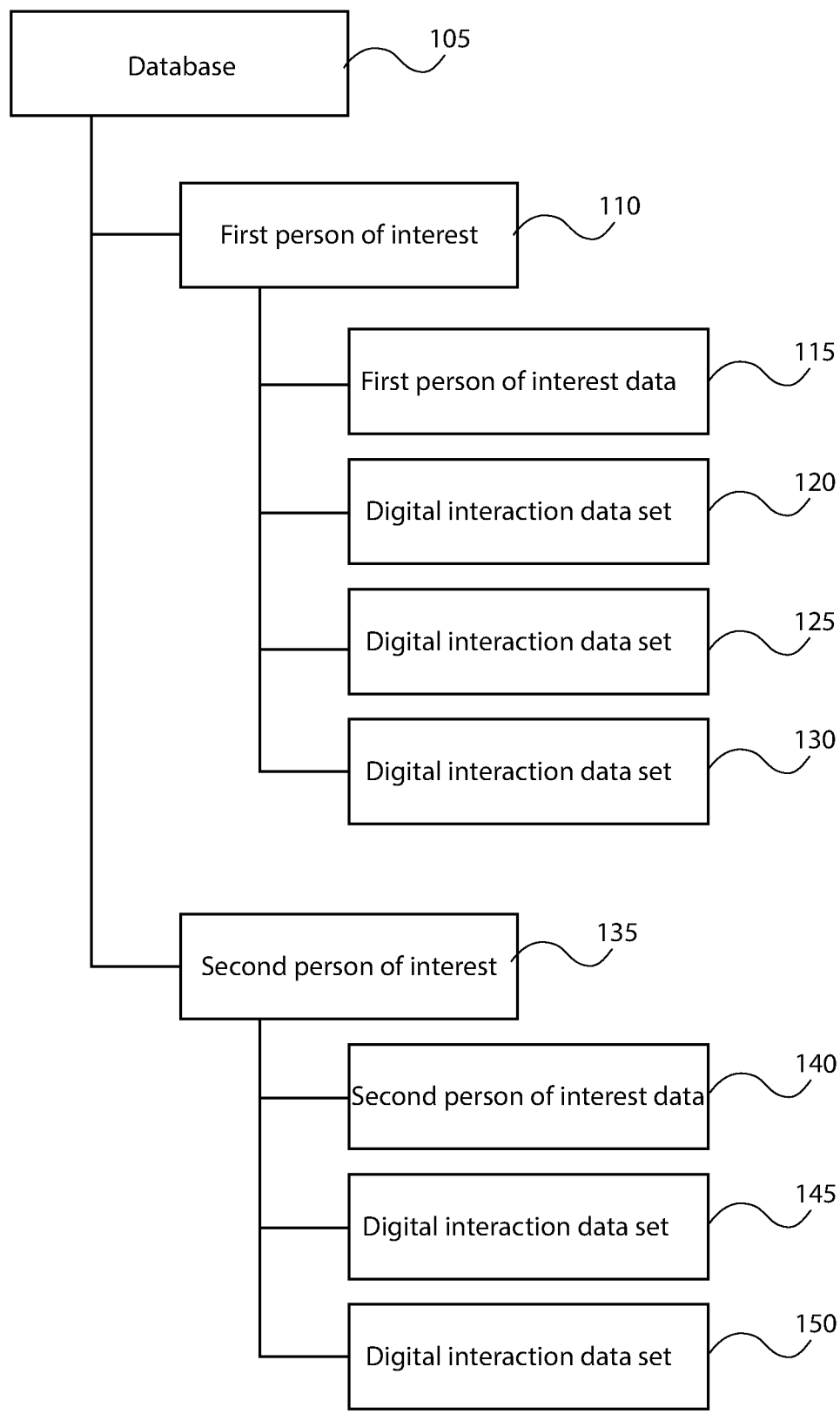
FIG. 1 is an example block diagram of a forensic database.

Systems and methods are disclosed for producing a forensic storyboard that includes visual details of a criminal case. A forensic storyboard may be created from data within a forensic database. The forensic storyboard may be provided to a user through an interactive webpage and the user may be able to revise the forensic storyboard through the interactive webpage.

Forensic investigations typically include a lot of information that may be part of a forensic case. Each case, for example, may include a number of subjects such as, for example, people, places, events, things, etc. These subjects, for example, may include many persons of interest, accomplices, victims, records of digital interactions, GPS data, notes, images of evidence, social media data, videos, interviews, etc., etc. All this information can become overwhelming and difficult to organize in way that it can be communicated simply to superiors, colleagues, partners, other agencies, prosecutors, or judges. Systems and methods are disclosed to automatically produce a forensic storyboard from data stored as part of a forensic case or provide a user interface that allows a user to create a forensic storyboard from data stored as part of the forensic case.

A forensic case may include data associated with a forensic investigation. The forensic case, for example, may include forensic database may include a first user's mobile phone records from a first mobile company and the forensic database may include a second user's mobile phone records from a second mobile phone company. The first and second mobile phone companies may be different. And the first user's mobile phone records and the second user's mobile phone records may be organized differently, may have different data elements, may have different format styles, etc. Yet an interaction between the first user and the second user may be found by searching the first user's mobile phone records and/or the second user's mobile phone records and retrieving related digital interactions such as, for example, phone records showing a phone call or message between the first user and the second user. In this example, these digital interactions may include a phone call, a text message, and/or a text message.

As another example, a forensic database may include a first user's mobile phone records, which may include GPS data specifying when and where the first user is located at various dates and times. The forensic database, for example, may also include license plate data (or GPS tracking data) for the second user's car at a various geolocations at a various time. An interaction may be found between the first user and the second user based on the geolocation and time data of the first user's mobile records and the second user's license plate data such as, for example, showing the first user and the second user in or around the same geolocation (e.g., within about 1, 0.75, 0.5, 0.25, 0.1 miles, etc., or within 1,000, 750, 500, 250, 100 feet etc.) or within about 0.1 miles to 5.0 miles, or 100 feet to 1,000 feet at the same time.

As another example, a forensic database may include Cellebrite data.

As another example, a forensic database may include a first user's mobile phone records that may include the content of text message (or an SMS message). The forensic database may also include a listing of keywords (or phrases) of interest (e.g., location specific gang related words, crime specific words, names of victims, names of suspects, location names, etc.). An interaction may be found between the content of the first user's mobile phone records and one or more keywords in the listing of keywords such as, for example, a match of one or more keywords and words found within the content of the first user's mobile phone records. Alternatively or additionally, the forensic database may include the content of a first user's email messages, social media posts, tweets, messenger messages, Snapchat messages, What's App messages, etc., etc.

As another example, a forensic database may include images, videos, text, media, audio, documents, etc.

FIG. 1 is an example block diagram of a forensic database 105. The forensic database 105 may include the digital interactions for one person of interest (or individual) or a plurality of persons of interest (or individuals). A person of interest may include person of interest in an investigation such as, for example, suspects, victims, witness, defendant, associate, etc. In this specific example, the forensic database 105 includes data associated with at least two persons of interest: a first person of interest data 110 and a second person of interest data 135.

In this example, the first person of interest data 110, may include first person of interest data 115. The first person of interest data 115 may include data about the first person of interest such as, for example, name, age, photograph(s), phone number, email address, address, social media ID, license plate, advertising id, other identifiers, etc.

In this example, the first person of interest data 110, may include the first digital interaction data set 120, the first digital interaction data set 125, and the first digital interaction data set 130 (collectively, the first person of interest data sets). Other additional digital interaction data sets may also be uploaded and included with the first person of interest.

The first person of interest data sets may include any digital interaction data set described in this document or other digital interaction data sets.

For example, the first digital interaction data set 120 may include a history of telephone records of the first person of interest to and from various other individuals. The first digital interaction data set 125 may include a history of text messages to and from the first person of interest to and from various other individuals. The first digital interaction data set 130 may include a history of digital interactions of the first person (e.g., posts, comments, images, videos, etc.) of interest on a social media platform.

In this example, the second person of interest data 135, may include the second person of interest data 140. The second person of interest data 140 may include data about the first person of interest such as, for example, name, age, photograph(s), phone number, email address, address, social media ID, license plate, advertising id, other identifiers, etc.

In this example, the second person of interest data 135, may include the second digital interaction data set 145 and the second digital interaction data set 150 (collectively, the second person of interest data sets). Other additional digital interaction data sets may also be uploaded and included with the second person of interest. The second person of interest data sets may include any digital interaction data set described in this document or other digital interaction data sets.

For example, the first digital interaction data set 120 may include a history of telephone records of the first person of interest to and from various other individuals. The first digital interaction data set 125 may include a history of text messages to and from the first person of interest to and from various other individuals. The first digital interaction data set 130 may include a history of digital interactions of the first person (e.g., posts, comments, images, videos, etc.) of interest on a social media platform.

For example, a first digital interaction in one of the first person of interest data sets and a second digital interaction in one of the second person of interest data sets can be linked such as, for example, in the data set directory 340. For example, the first digital interaction may include a history of phone records between the first person of interest and a number of other people. If one of these other people includes the second person of interest, the digital interaction (e.g., the phone call between the two) in the first person of interest data sets and the digital interaction in the second person of interest data sets can be linked. As another example, the first digital interaction may include a history of messages (e.g., text, SMS, messenger, WhatsApp, WeChat, etc.) between the first person of interest and a number of other people. If one of these other people includes the second person of interest, the digital interaction (e.g., the message between the two) in the first person of interest data sets and the digital interaction in the second person of interest data sets can be linked.

Two digital interactions can be linked in a number of different ways. As one example, the first person of interest data 115 may include a first phone number. An algorithm executing on a process (e.g., in the cloud) may search all or most digital interactions within all digital interaction data sets (e.g., other than the person of interest associated with the first phone number) for phone calls to or from the first phone number. This can be done for each phone number, messenger ID, email address, etc. associated with the first person of interest and or stored in the first person of interest data 115. This may also be done for each person of interest.

As another example, each digital interaction associated with one person of interest may be compared with each digital interaction associated with another person of interest. If a correlation is found, a link between the two digital interactions may be created. For example, an algorithm may select a first digital interaction from a first digital interaction data set. An identifier (e.g., phone number, email address, Id, username, etc.) associated with the first digital interaction may be extracted. This identifier may then be used to search all or most digital interactions within all: digital interaction data sets for the identifier. If an interaction is found between the identifier and another digital interaction, then a link between the digital interactions can be made.

A link between digital interactions, for example, shows that a digital interaction occurred between the two persons of interest. This digital interaction may also be associated with duration data, the direction of the digital interaction, the location of the sender or the receiver, and/or content of the digital interaction, etc.

Figure 2:
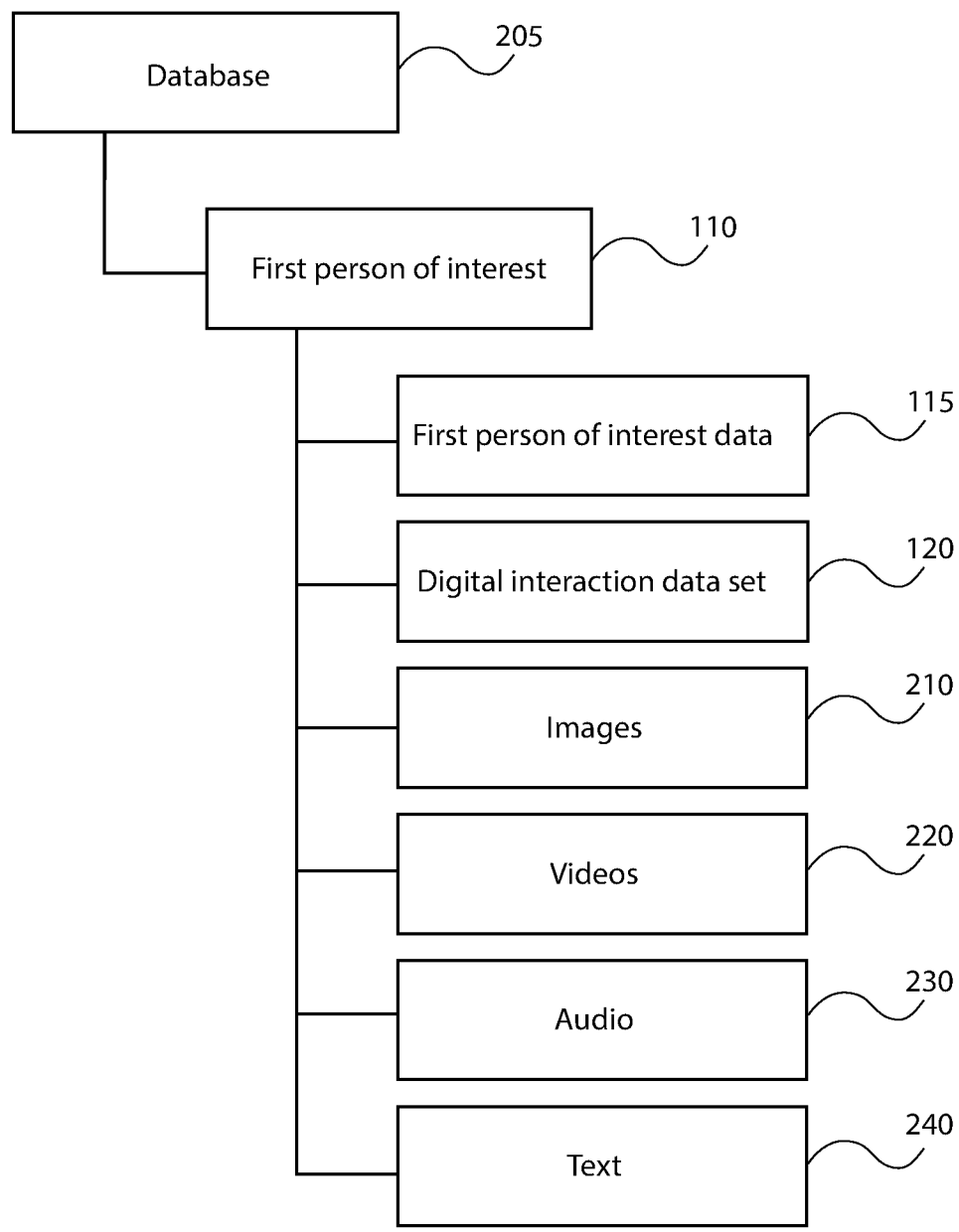
FIG. 2 is an example block diagram of a forensic database.

FIG. 2 is an example block diagram of forensic database 205 showing first person of interest data with other information such as, for example, interest data 115, first digital interaction/data set 120, image data 210, video data 220, audio data 230, and/or text data 240.

In this example, the first person of interest data 110, may include first person of interest data 115. The first person of interest data 115 may include data about the first person of interest such as, for example, name, age, photograph(s), phone number, email address, address, social media ID, license plate, advertising id, other identifiers, etc. In this example, the first person of interest data 110, may include the first digital interaction data set, the first digital interaction data set, and the first digital interaction data set (collectively, the first person of interest data sets). Other additional digital interaction data sets may also be uploaded and included with the first person of interest. The first person of interest data sets may include any digital interaction data set described in this document or other digital interaction data sets.

For example, the first digital interaction data set may include a history of telephone records of the first person of interest to and from various other individuals. The first digital interaction data set may include a history of text messages to and from the first person of interest to and from various other individuals. The first digital interaction data set may include a history of digital interactions of the first person (e.g., posts, comments, images, videos, etc.) of interest on a social media platform.

The forensic database 205, for example, may also include image data 210 associated with the forensic case. The image data 210, for example, may include images uploaded by a user through a web interface. The image data 210, for example, may include images downloaded from one or more social media sites. The image data 210, for example, may include crime scene photos, images of retained evidence (e.g., weapons, drugs, cars, etc.), mug shots, images from SMS messages, videos from SMS messages, license plate images, CCTV images, security camera images, etc. Image data 210, for example, may be associated with a timestamp. The timestamp, for example, may be extracted from metadata associated with the image or may be entered by a user.

The forensic database 205, for example, may also include video data 220 associated with the forensic case. The video data 220, for example, may include video uploaded by a user through a web interface. The video data 220, for example, may include video downloaded from one or more social media sites. The video data 220, for example, may include crime scene movies, videos of retained evidence (e.g., weapons, drugs, cars, etc.), videos from SMS messages, etc. Video data 220, for example, may be associated with a timestamp. The timestamp, for example, may be extracted from metadata associated with the video or may be entered by a user.

The forensic database 205, for example, may also include audio data 230 associated with the forensic case. The audio data 230 for example, may include audio uploaded by a user through a web interface. The audio data 230, for example, may include audio downloaded from one or more social media sites. The audio data 230, for example, may include audio from interviews with suspects, victims, accomplices, witnesses, etc., audio messages, voicemail, etc. Audio data 230, for example, may be associated with a timestamp. The timestamp, for example, may be extracted from metadata associated with the audio or may be entered by a user.

The forensic database 205, for example, may also include text data 240 associated with the forensic case. The text data 240, for example, may include text input by a user through a web interface. The text data 240, for example, may include notes about any portion of the case such as, for example, notes about the first person of interest data 110, notes about the second person of interest data 135, notes describing a crime scene, notes summarizing an interview with a witness, accomplices, persons of interest, suspect, or victim, portions or all of a transcription of an interview with a witness, accomplices, persons of interest, suspect, or victim, notes describing evidence, a timeline of events, general case notes, emails, messages, signed documents, etc. Some text, for example, may be linked with various other data elements within the forensic database 205. For example, text within the text data 240 may be linked with one or more data elements within the first person of interest data 110. Text within the text data 204, for example, may be linked with an image in the image data 210, the video in video data 220, or audio in the audio data 230. Text data 240, for example, may be associated with a timestamp. The timestamp, for example, may be extracted from metadata associated with the text or may be entered by a user.

The forensic database 205 may include any other data or media about the case such as, for example, data about persons, places, events, things, maps, etc.

Figure 3:
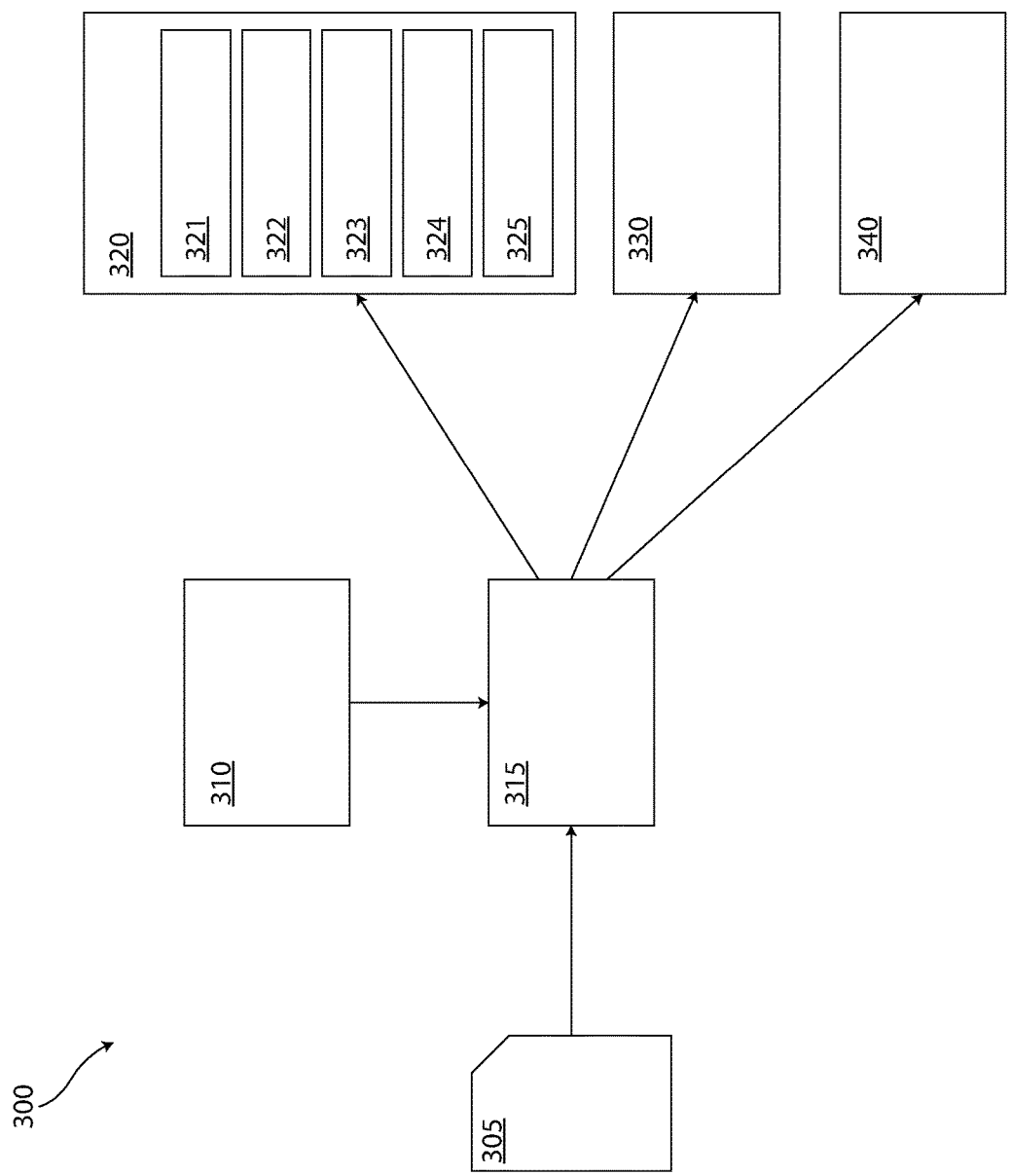
FIG. 3 is an example block diagram of a process for creating a forensic database.

FIG. 3 is an example block diagram of a processing structure 300 for creating a forensic database.

One or more input files 305 can be processed with processor 315 using mapping definition 310 into one or more digital interaction data sets 330 and/or one or more digital interaction data set descriptors 320.

The processor 315 may include any or all elements of the computational system 1000. The processor 315 may be a cloud based processor with one or more dedicated and/or remote processors. The processor 315 may operate on one or more digital interaction data sets.

The processor 315 may include a plurality of processors. Each processor 315 of the plurality of processors may process a specific type of input file 305. For example, a first processor may process Verizon phone records. A second processor, for example, may process Facebook records. A third process, for example, may process AT&T phone records. A fourth processor, for example, may process messaging records. Various other specific processors may also be used.

Figure 4:
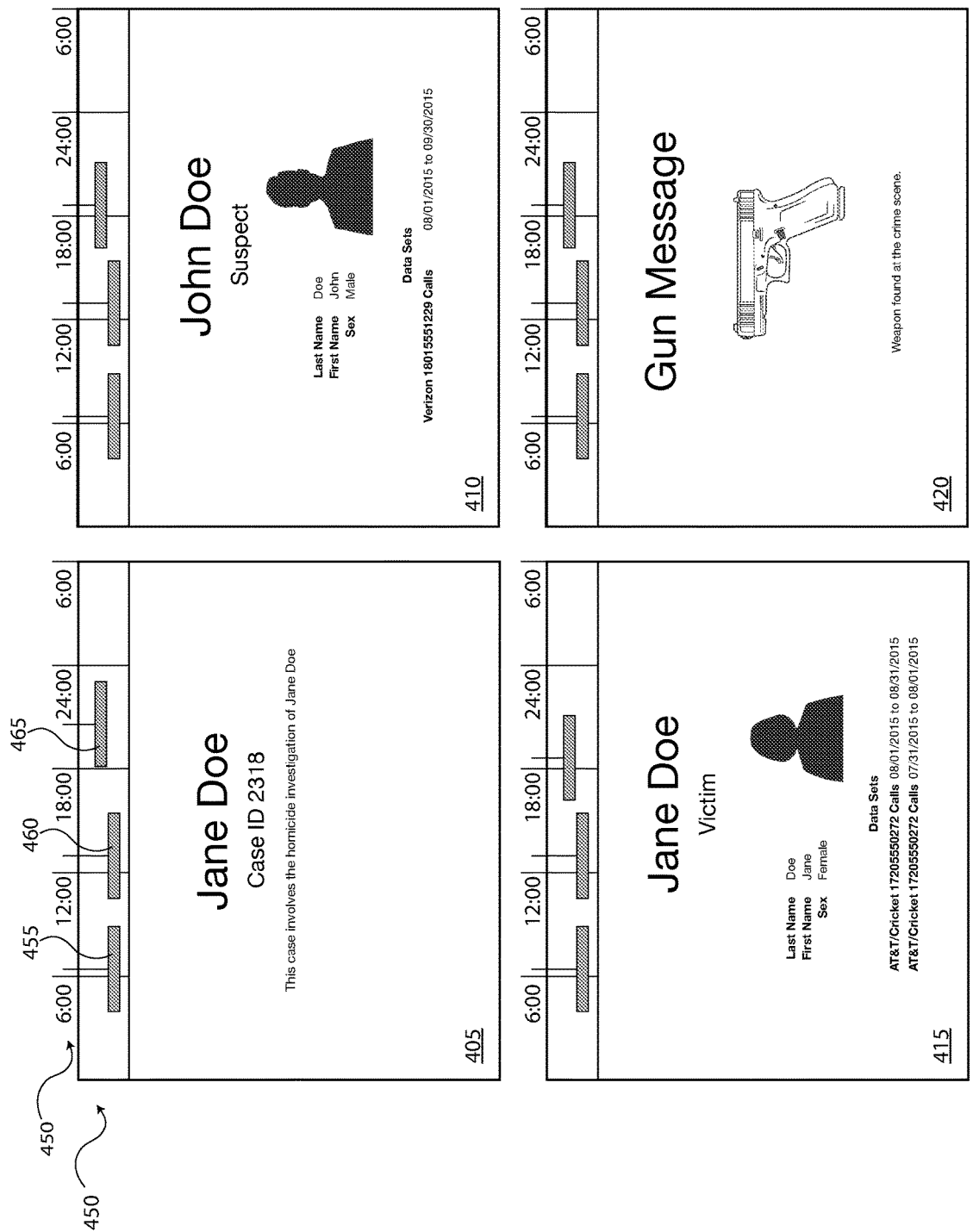
FIG. 4 and FIG. 5 show examples of a forensic storyboard.
Figure 5:
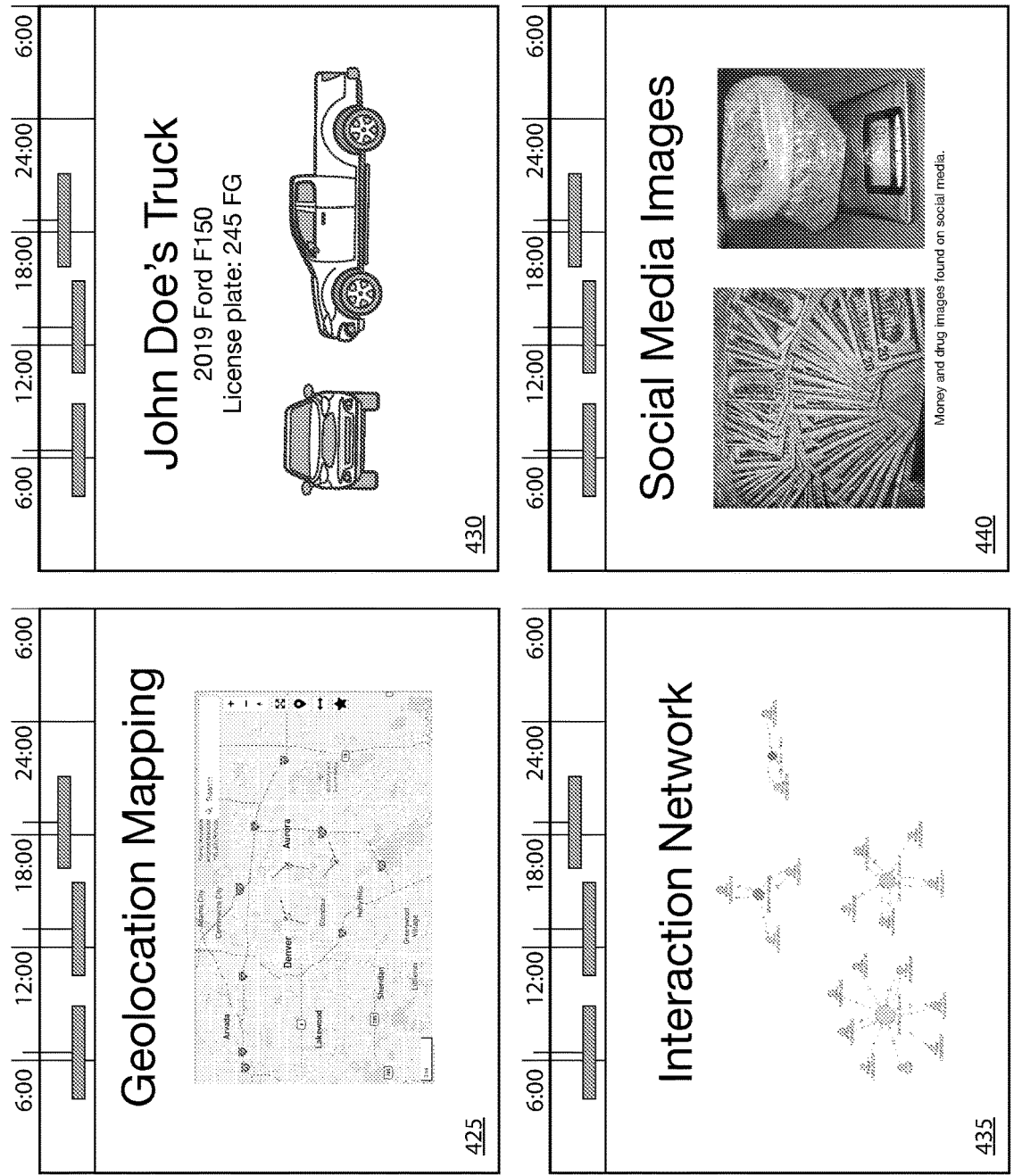

FIG. 4 and FIG. 5 show examples of a forensic storyboard having eight slides. While eight slides are shown, any number of slides may be created. The forensic storyboard may be used by an investigator to communicate details of a forensic investigation to superiors, colleagues, partners, other agencies, prosecutors, or judges.

Slide 405, for example, includes a suspect's name, a case number, and a description of the case. This information, for example, can be pulled from a person of interest data set (e.g., first person of interest data 115). Slide 405 may be created from data within the person of interest data set.

Slide 405 includes a timeline 450. The timeline 450, for example, may include a graphical representation of dates and/or times, and one or more graphical representations of events that correspond with a given date and/or time on the timeline. The graphical representation may include any symbol, shape, line, or graphic. The graphical representation, for example, may be placed on the timeline in a location that indicates when an event occurred that is linked with the graphical representation. Every subject, person, image, video, map, audio, etc., for example, that is associated with a date and/or time may be associated a graphical representation that is placed on the timeline. As another example, user selected subjects, persons, images, videos, maps, audio, etc., associated with a date and/or time may be associated with a graphical representation that is placed on the timeline. Each graphical representation may include a hyperlink associated with a slide such that when a user clicks on the graphical representation the associated slide is displayed.

For example, bar 455 is a graphical representation shown on the timeline 450 at a time of about 6:30; bar 460 is a graphical representation shown on the timeline 450 at a time of about 13:00, and bar 465 is a graphical representation shown on the timeline 450 at a time of about 21:00.

For example, the bar 455 may be associated with the slide 420. The date and/or time associated with bar 455 may represent the date and/or time entered by an investigator for when the: gun shown on slide 420 was found or used. As another example, the bar 460 may be associated with the slide 430. The date and/or time associated with bar 460 may represent the date and/or time entered by an investigator for when the truck shown on slide 430 was scene and/or the date or time the truck shown on slide 430 was recorded passing a license plate reader (e.g., at a toll both or elsewhere). As another example, the bar 465 may be associated with the slide 425. The date and/or time associated with bar 465 may represent the date and/or time entered by an investigator for an event that occurred at a location on the maps shown on slide 425.

If an additional slide is added to the storyboard and the additional slide includes a date and/or time, that date and/or time may be added to the timeline 450 along with a graphical representation of the data and/or time on the timeline and/or the graphical representation may be linked to the new slide.

The scale of the timeline 450 may be adjustable to allow a user to see a shorter or longer period of time covered by the timeline and the associated graphical representations during the time period. As the time period is adjusted graphical representations of date and/or times may be added or removed as they fall within or without the time period.

Slide 410, for example, may include an image of the suspect. Slide 410, for example, may include data about a suspect such as, for example, name, sex, age, gender, race, etc. This information, for example, can be pulled from the person of interest data set (e.g., the first person of interest data set 115). In this example, the slide 410 includes information about a digital interaction data set associated with the suspect. In this example, the digital interaction data set is a Verizon Wireless call log data set. This digital interaction data set, for example, may be pulled from the digital interaction data set. The dates covered by the digital interaction data set may be displayed.

Slide 415, for example, includes an image of a victim. Slide 415, for example, may include data about the victim such as, for example, name, sex, age, gender, race, etc. This information, for example, can be pulled from a person of interest data set (e.g., the second person of interest data set 135). In this example, the slide 415 includes information about a digital interaction data set associated with the suspect. In this example, the digital interaction data set is an AT&T call log data set. This digital interaction data set, for example, may be pulled from the digital interaction data set. The dates covered by the digital interaction data set may be displayed. Slide 420 includes an image of a weapon used at the scene of a crime. The image of the weapon, for example, may be retrieved from the forensic database 205 and/or image data 210. The text of slide 420 may include a description of the weapon and may be retrieved from forensic database 205 and/or text data 240.

Slide 425 includes an image of a map with geolocation markers. The geolocation data, associated with the geolocation markers, for example, may be retrieved from the second digital interaction data set 145 and/or the first digital interaction data set 120 and corresponding markers may be placed on the map.

Slide 430 includes images of a vehicle used by the suspect. The images of the vehicle, for example, may be retrieved from the forensic database 205 and/or image data 210. The text of slide 430 may include a description of the vehicle and may be retrieved from forensic database 205 and/or text data 240.

Slide 435 includes an image of interactions between various persons of interest. The image of interactions, for example, can be created based on data in the first digital interaction data set 120 and/or the second person of interest data set 135. These interactions, for example, can be found in part or in full using process 700. These interactions, for example, can be found or created based on the first digital interaction data set 120 and/or the second digital interaction data set 145.

Slide 440 includes images of drug paraphernalia related to a suspect. The images of the drug paraphernalia, for example, may be retrieved from the forensic database 205 and/or image data 210. The text of slide 440 may include a description of the drug paraphernalia and may be retrieved from forensic database 205 and/or text data 240.

Figure 6:
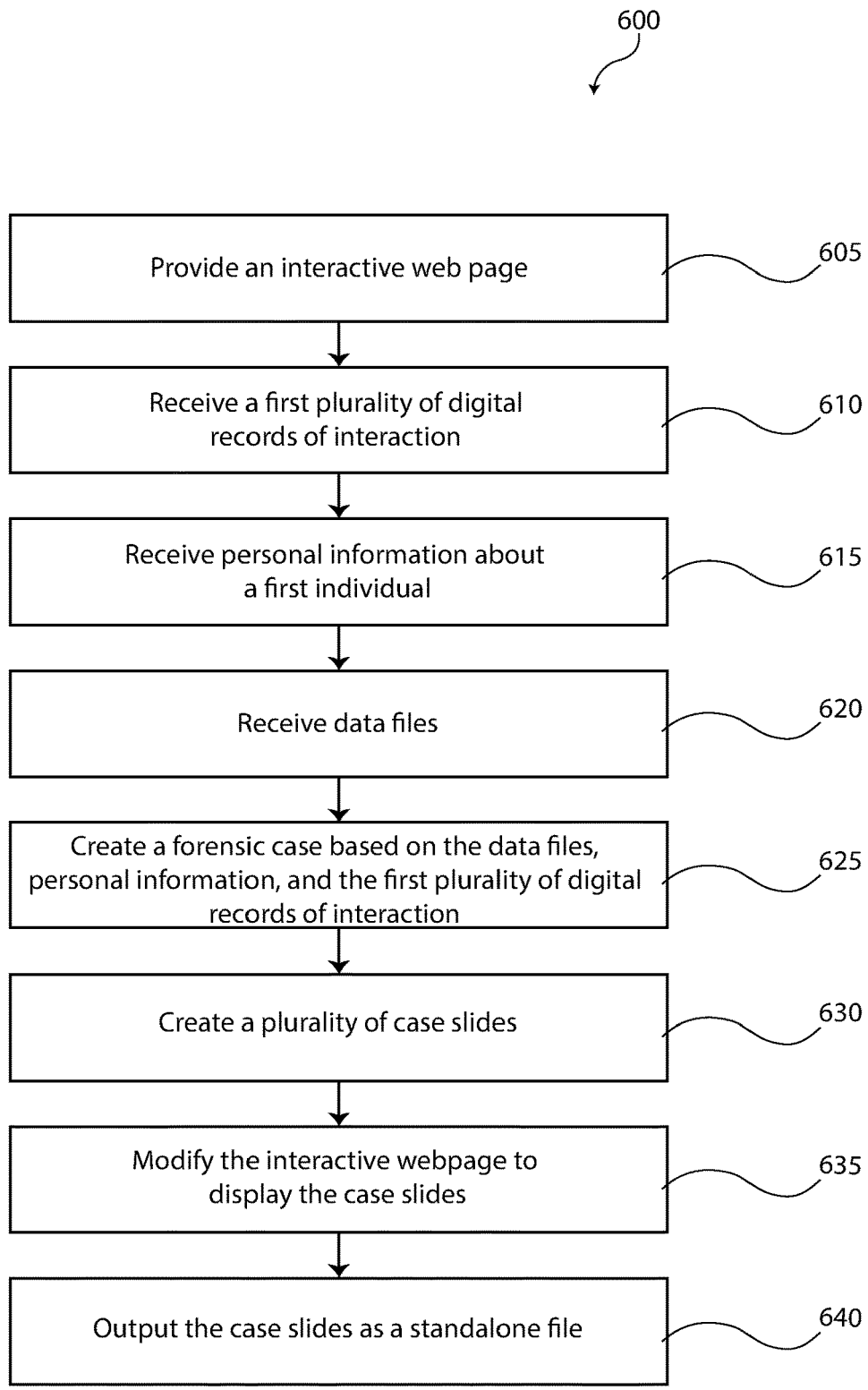
FIG. 6 is an example flowchart of a process for creating a forensic storyboard.

FIG. 6 is an example flowchart of a process 600 for creating a forensic storyboard. At block 605 an interactive webpage may be provided to a user. The interactive webpage may allow the user to upload and/or interact with any data stored in forensic database 105 and/or forensic database 205. The process 600 may be executed by computational system 1100 and/or cloud computing system 1000.

At block 610 a first plurality of digital records of interaction may be received from the user via the interactive webpage. The first plurality of digital records of interaction may include any of first digital interaction data set 120, first digital interaction data set 125, and/or first digital interaction data set 130.

At block 615 personal information may be received about first individual through the interactive webpage. The personal information may include name, birthdate, gender, race, title (e.g., suspect, accomplish, victim, etc.), height, weight, eye color, glasses, etc. The personal information may be tied to one or more records of digital interaction received at block 610.

At block 620 one or more data files may be received such as, for example, uploaded through the interactive webpage. The one or more data files may include image data 210, video data 220, audio data 230, and/or text data 240.

At block 625 a forensic case can be created based on the one or more data files, the personal information, and/or the plurality of digital records. The forensic case may include forensic database 105 and/or forensic database 205.

At block 630 a plurality of forensic case slides may be created from the forensic case. The forensic case slides may, for example, include any of case slides shown in FIG. 9 or FIG. 10. The forensic case slides, for example, may include slides about persons of interest, slides about suspects, slides about accomplices, slides about witnesses, slides about victims, etc. A slide about individuals, for example, may be created for each person of interest within a forensic database (e.g., forensic database 105 and/or the forensic database 205). As another example, a user may be provided a menu listing all the persons of interest with the forensic database. Slides may be created based on persons of interest selected by the user.

The forensic case slides, for example, may include slides about each image within the forensic database 205. These slides my include one or more images from image data 210. These slides, for example, may include notes or text (e.g., text data 240) about each image. As another example, a user may be provided a menu listing all the images within image data 210 within the forensic database. Slides may be created based on the images selected by the user.

The forensic case slides, for example, may include slides about each video within the forensic database 205. These slides my include one or more videos from video data 220. These slides, for example, may include notes or text (e.g., text data 240) about each video. As another example, a user may be provided a menu listing all the videos within video data 220 within the forensic database. Slides may be created based on the videos selected by the user.

The forensic case slides, for example, may include slides about each audio within the forensic database 205. These slides my include one or more videos from audio data 230. These slides, for example, may include notes or text (e.g., text data 240) about each audio. As another example, a user may be provided a menu listing all the audio within audio data 230 within the forensic database. Slides may be created based on the audio selected by the user.

The forensic case slides, for example, may include slides about each audio within the forensic database 205. These slides my include one or more videos from audio data 230. These slides, for example, may include notes or text (e.g., text data 240) about each audio. As another example, a user may be provided a menu listing all the audio within audio data 230 within the forensic database. Slides may be created based on the audio selected by the user.

The forensic case slides, for example, may include slides about each text file within the forensic database 205. These slides my include one or more text files from text data 240. As another example, a user may be provided a menu listing all the text files within text data 240 within the forensic database. Slides may be created based on the audio selected by the user.

At block 635 the case slides, for example, may be displayed via the interactive webpage. The interactive webpage may allow a user to manipulate the slides such as, for example, allow the user to modify text, add text, move text, move images, add images, etc.

The interactive webpage may allow a user to view one or more slides, arrange the order of slides, delete one or more slides, add one or more slides, etc.

At block 640 the case slides may be output as a standalone file. The standalone file, for example, may include a pdf file, an HTML file, a power point file, etc.

Figure 7:
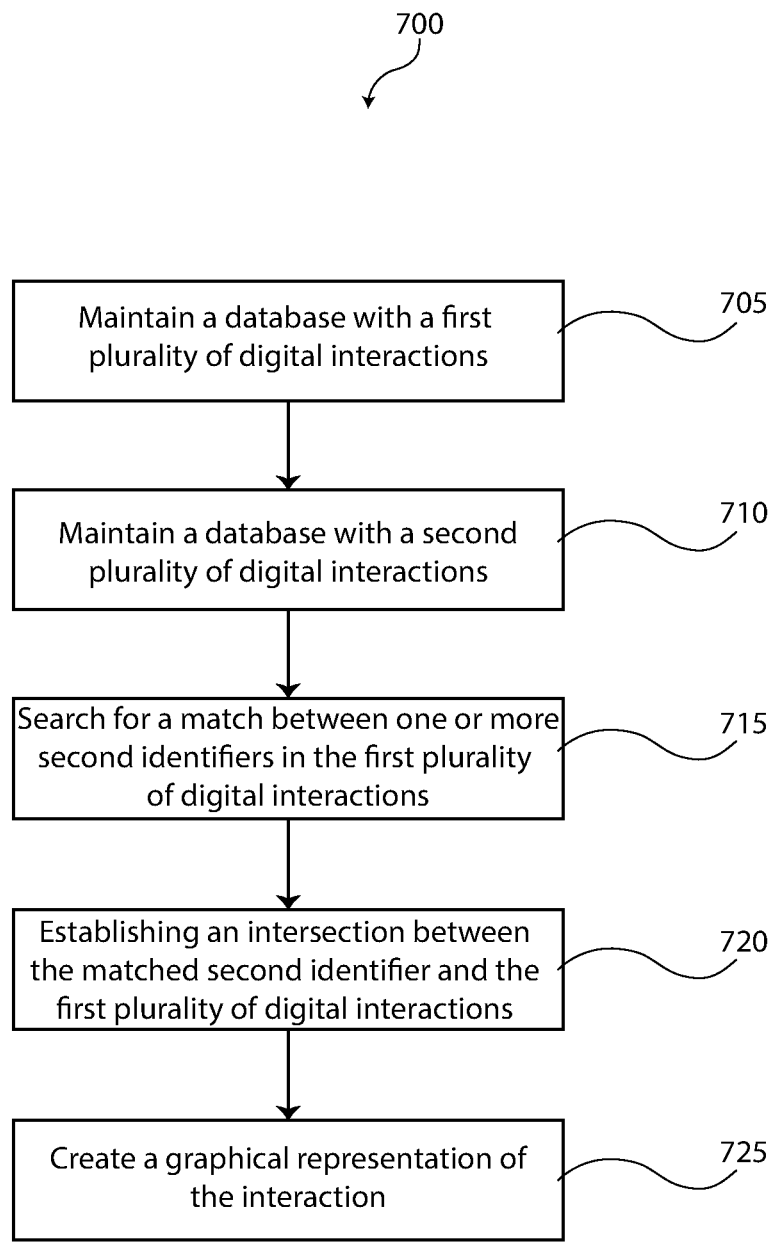
FIG. 7 is an example flowchart of a process for providing a forensic digital interaction database and/or viewer.

FIG. 7 is an example flowchart of a process 700 for providing a subject filtering tool of a forensic database. The blocks of process 700 may occur in any order. Additional blocks may be added to process 700. Some blocks may be removed, skipped, or modified. The process 700 may be executed by computational system 1100 and/or cloud computing system 1000.

At block 705 a first plurality of digital interactions may be maintained in a forensic database (e.g., the first digital interaction data set 120 and/or the first digital interaction data set 125 and/or the second digital interaction data set 145 and/or the second digital interaction data set 150). The first plurality of digital interactions, for example, may include a first plurality of digital records of interaction between a first identifier associated with a first individual and a first plurality identifiers associated with a first plurality of individuals. The first plurality of digital records may have been recorded by a first provider.

At block 710 a second plurality of digital interactions may be maintained in a forensic database (e.g., the first digital interaction data set 120 and/or the first digital interaction data set 125 and/or the second digital interaction data set 145 and/or the second digital interaction data set 150). The second plurality of digital interactions, for example, may include a second plurality of digital records of interaction between a second identifier associated with a second individual and a second plurality identifiers associated with a second plurality of individuals. The first plurality of digital records may have been recorded by a first provider. The second plurality of digital interactions may have been recorded by a second provider. The second provider, for example, may be different and/or distinct from the first provider. The second provider, for example, may be the same as the first provider.

For example, the first plurality of digital interactions and/or the second plurality of digital interactions may include a listing of keywords (or phrases) of interest (e.g., location specific gang related words, crime specific words, names of victims, names of suspects, location names, etc.). The listing of keywords may be entered by a user and/or stored in memory.

For example, the first plurality of digital interactions and/or the second plurality of digital interactions may include a listing of locations such as, for example, GPS points, geofenced boundaries, etc.

An additional plurality of digital interactions, for example, may be used that are similar to or different from either or both the first plurality of digital interactions and the second plurality of digital interactions.

For example, the first plurality of digital interactions and/or the second plurality of digital interactions may include cell phone records, text message records, email records, social media records, messenger records, WhatsApp records, Snapchat records, financial transaction records, GPS tracker data, mobile phone GPS data, license plate data, store receipt data, government registration data (e.g., DMV records, board registration records, professional license records, etc.), store receipts, etc.

The first provider and/or the second provider, for example, may include a mobile phone carrier (e.g., Verizon, AT&T, T-Mobile, Sprint, etc.), a social media company (e.g., Facebook, LinkedIn, Snapchat, Instagram, TikTok, etc.), a messaging company (e.g., messenger, WhatsApp, WeChat, iMessage, Messages, etc.), a mobile phone provider (e.g., Android, Apple, etc.), a map company (e.g., Google Maps, Apple Maps, etc.), an advertising id tracking company (e.g., Babel X), etc.

At block 715, a search for an interaction between a second identifier of the second plurality of digital interactions and an identifier of the first plurality of digital interactions may be performed. The search, for example, may include searching for the second identifier in the first plurality of digital interactions or an identifier similar to the second identifier in the first plurality of digital interactions. The search for an interaction between the second identifier and an identifier of the first plurality of digital interactions may include searching within a selected time period such as, for example, a preset time period or a user-entered time period. The selected time period, for example, may include the time period between the first data entry and the last data entry within first data set and/or between the first interaction of the first plurality of digital interactions and the last interaction of the first plurality of digital interactions.

For example, if the first plurality of digital interactions comprises a plurality of incoming phone calls and outgoing phone calls from a phone associated with the first identifier and the second identifier comprises a second phone number, the search may include comparing the second identifier of the second plurality of digital interactions with the incoming phone calls and the outgoing phone calls.

As another example, if the first plurality of digital interactions comprises a plurality of incoming text messages and outgoing text messages from a device associated with the first identifier and the second identifier comprises a second phone number, the search may include comparing the second identifier of the second plurality of digital interactions with the incoming text messages and the outgoing text messages.

As another example, if the first plurality of digital interactions may comprise the content of a plurality of text messages to or from a device associated with the first identifier and the second identifier of the second plurality of digital interactions comprises one or more keywords, the search may include comparing the one or more keywords with the content of the text messages.

As another example, if the first plurality of digital interactions may comprise a plurality of incoming and outgoing email messages associated with a first email address and the second identifier of the second plurality of digital interactions comprises a second email address, the search may include comparing the second email address with the plurality of incoming and outgoing email messages in the first database.

As another example, if the first plurality of digital interactions may comprise the content of a plurality of email messages associated with a first email address and the second identifier of the second plurality of digital interactions comprises one or more keywords, the search may include comparing the one or more keywords with the content of the email messages.

As another example, if the first plurality of digital interactions comprises a first plurality geolocation tags where each geolocation tag indicates the geolocation and time of the first user (or a first user device) over a period of time and the second identifier of the second plurality of digital interactions comprises a second geolocation tag, the search may compare the second geolocation tag with the first plurality of geolocation tags.

At block 715, for example, each identifier within the second plurality of digital interactions may be used as the second identifier. This may, for example, result in search for a match for each identifier of the second plurality of identifiers in the first plurality of digital interactions.

At block 720, a first digital interaction between the first identifier and the second identifier may be established. The first digital interaction, for example, may include the type of digital interaction, the date of the digital interaction, the time of the digital interaction, the duration of the digital interaction, the content of the digital interaction, the name of the first user associated with the first plurality of identifiers, the name of the second user associated with the second plurality of identifiers, etc.

The first digital interaction, for example, may include a link between he first identifier and the second identifier. A link, for example, may include data connecting the first identifier and the second identifier. The link, for example, may be stored in the forensic database. The link, for example, may include data elements that connect the first identifier with the second identifier.

At block 725, a graphical representation of the digital interaction may be created. The graphical representation, for example, may include one or more of HTML code, images, text, charts, graphics, etc. The graphical representation may include the graphical representation shown in FIG. 9. The graphical representation, for example, may include the type of common values, the number of occurrence of the common values, and the data locations (e.g., data bins, or data records), where the common values can be found.

The graphical representation, for example, may be published to one more users such as, for example, on a webpage, within an application executing on a computer or smartphone, etc.

Process 700 may also allow a user to select the first plurality of digital interactions and the second plurality of digital interactions from a plurality of data sets that each include a plurality of digital interactions. For example, a database may include any number of data sets of digital interactions.

A graphical representation, for example, may be presented to a user allowing the user to select the first plurality of digital interactions and the second plurality of digital interactions from the plurality of data sets. The graphical representation, for example, may be presented to the user to select or enter a selected time period.

A graphical representation, for example, may be presented that lists all or a subset of the digital interactions between the first plurality of digital interactions and the second plurality of digital interactions. The graphical representation, for example, may allow the user to select one of the digital interactions and present the details of the selected digital interaction as part of the graphical representation.

As another example, the graphical representation, for example, may allow the user to filter all or a subset of the digital interactions between the first plurality of digital interactions and the second plurality of digital interactions. The filter, for example, may include filtering based on the sender, receiver, contacts, distance, duration, location, start time, end time, forwarded, username, record type, etc.

Figure 8:
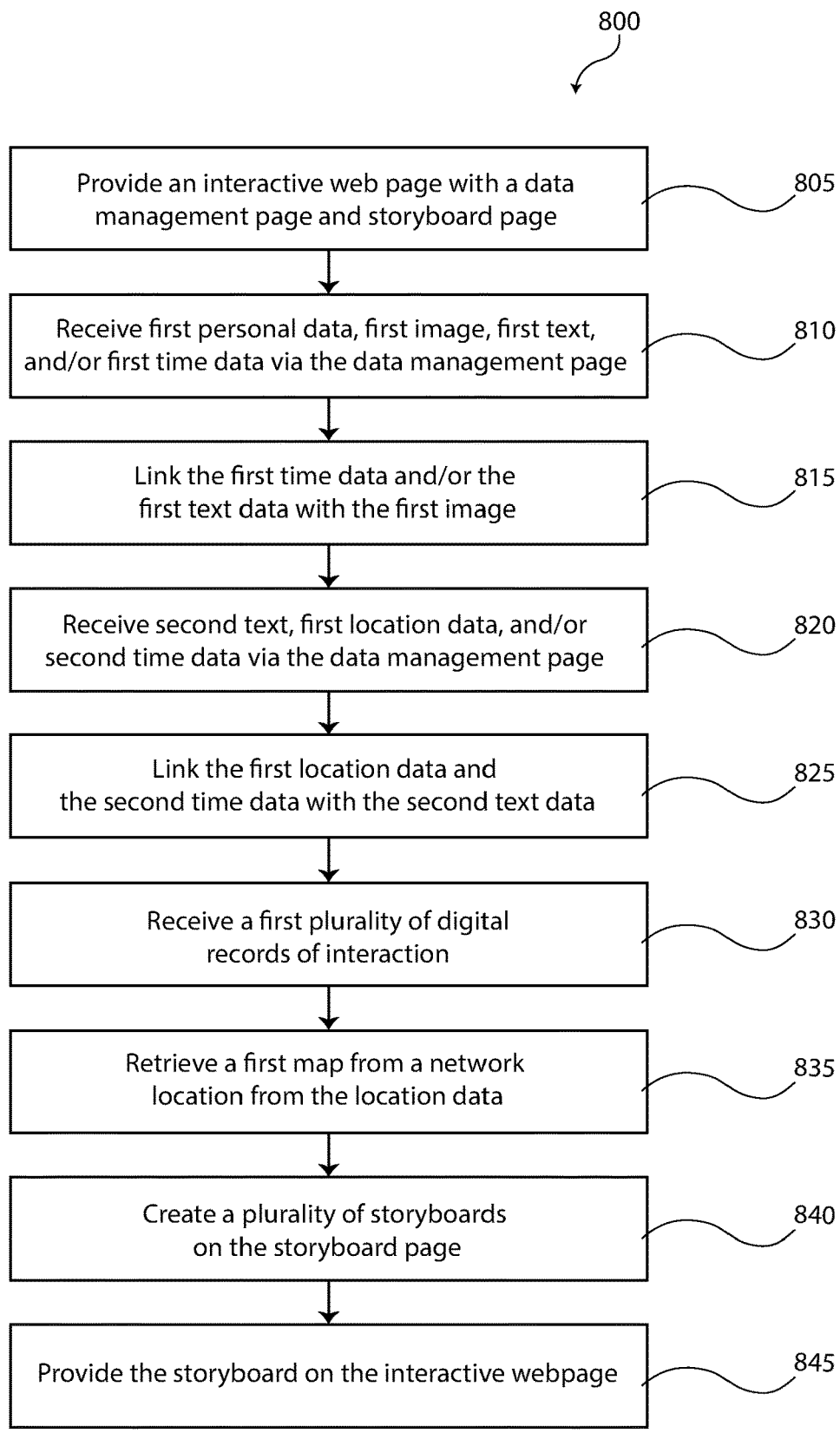
FIG. 8 is an example flowchart of a process for creating a forensic storyboard.

FIG. 8 is an example flowchart of a process 800 for creating a forensic storyboard. The blocks of process 800 may occur in any order. Additional blocks may be added to process 800. Some blocks may be removed, skipped, or modified. The process 800 may be executed by computational system 1100 and/or cloud computing system 1000.

Process 800 begins at block 805 where an interactive webpage is provided. The interactive webpage, for example, may include at least data management page and storyboard page. The data management page, for example, may include tools and/or interfaces that allow a user to upload data, manipulate data, add text to data, arrange data, etc. The interactive webpage, for example, may include one or more pages with tools and/or interfaces that allow a user to manage, manipulate, view, analyze, etc. digital interactions between various subjects or persons of interest.

At block 810 various data may be upload via the data management page. This data may include, for example, first personal data about a first subject, a first image, first text, and/or first time data that may be associated with the first image and/or the firs subject. The first personal data, for example, may include name, birthdate, gender, race, title (e.g., suspect, accomplish, victim, etc.), height, weight, eye color, glasses, etc. The first image, for example, may include any type of image such as, for example, an image of the first subject, an image of a crime scene, an image of a weapon, an image from social media, an image extracted from a digital interaction, an image from a SMS message, an image from social media, etc. The first text, for example, may include text entered into a form on the data management page. The first time data may include a data and/or time of an event associated with the first subject and/or the first image.

At block 815, the first time data and the first text data may be linked with the first image such as, for example, within a forensic database. The first time data and/or the first text data may also be linked with the first subject and/or the first image.

At block 820 various data may be upload via the data management page. This data may include, for example, second text data, first location data, and/or second time data. The first location data, for example, may include any data that provides geolocation data such as, for example, an address, latitude and longitude, GPS data, etc. The first location data, for example, may be associated with an event related to the forensic investigation such as, for example, a crime scene location, a meeting location, a location of a known siting of a subject, a suspect location, etc. The second time data, for example, may include data and/or time data associated with the event that occurred at the first location. The second text data, for example, may include text entered into a form on the data management page such as, for example, about the first location.

At block 825, the first location data and/or the second time data may be linked with the second text data such as, for example, within the forensic database.

At block 830 a first plurality of digital records of interaction can be received such as, for example, via the data management page. The first plurality of digital records of interaction may include any of first digital interaction data set 120, first digital interaction data set 125, and/or first digital interaction data set 130. The first plurality of digital records of interaction, for example, can be between a first identifier associated with the first subject and a first plurality of identifiers each associated with a respective one of a first plurality of individuals. The first plurality of digital records may have been recorded by a first provider. Each of the first plurality of digital records may include a plurality of data elements.

At block 835 a first map can be retrieved from a network location using the location data. The first map, for example, may show the first location and/or an area surrounding the first location. The first map may include a graphical representation on the map showing the first location. The map may include various other data.

At block 840, A plurality of story boards can on the storyboard page, each storyboard of the plurality of storyboards comprising graphical and/or textual representations of data. These storyboards may be similar to those shown in FIG. 4 and FIG. 5.

A first storyboard of the plurality of storyboards may include the first personal data, a reference to the first plurality of records, and/or a timeline. The timeline, for example, may include a visual representation of the first time data and a visual representation of the second time data. The visual representation of the first time data, for example, may include a link to the second story board such that when clicked by a user viewing either the first story board or the third story board the second story board is presented to the user.

A second storyboard, for example, may include the first image, the first text, the first time data, and/or the timeline. A third storyboard may include the second text, the second time location, the first map, and/or the timeline.

At block 845, the storyboard is provided on the interactive webpage in response to a request for the interactive webpage.

The process 800, for example, may export the plurality of storyboards as a standalone file, the standalone file comprising a file selected from the group consisting of a pdf file, an HTML file, and a power point file.

The process 800, for example, may receive second personal data about a second subject via the data management page. The plurality of storyboards, for example, may include a fourth storyboard that includes the second personal data.

The process 800, for example, may also receive a second plurality of digital records of interaction. The second plurality of digital records of interaction may include interactions between a second identifier associated with the second subject and a second plurality of identifiers each associated with a respective one of a second plurality of individuals. The second plurality of digital records, for example, may have been recorded by a second provider. Each of the second plurality of digital records, for example, may include a plurality of data element. The fourth storyboard, for example, includes a reference to the second plurality of records.

A digital interaction between the first subject and the second subject, for example, may be established based on an interaction between a data element of the first plurality of digital records and a data element of the second plurality of digital records. A representation of the first digital interaction between the first subject and the second subject may be provided on one or more storyboards.

The process 800, for example, may also receive changes to one or more of the first text data, the first time data, the first location data, the second text data, and/or the second time data from a user interacting with the data on the interactive webpage. The plurality of storyboards may be automatically updated based on the changes.

The process 800, for example, may also receive third data and third time data via the data management page. The third data and the third time data may be linked together. The timeline may be updated to include a representation of the third time data. The plurality of storyboards may be updated to include another storyboard that includes a visual and/or textual representation of the third data.

FIG. 9 is a graphical representation of a digital interaction between a one or more identifiers in a first plurality of identifiers and one more identifiers in a second plurality of identifiers. In this example, the three graphical representation of digital interactions are shown: phone call, text message, and license plate tracking. In this example, the graphical representation includes a digital interaction ID, digital interaction type, the digital interaction data set where the date is retrieved, the start time of the digital interaction, the end time of the digital interaction, the duration of the digital interaction, the sender of the digital interaction, the receiver of the digital interaction, and a location where the digital interaction occurred. Various other data may be presented.

As another example, the graphical representation may include a tabular display of the digital interaction between a one or more identifiers in a first plurality of identifiers and one more identifiers in a second plurality of identifiers.

Various other graphical representations of a digital interaction between two different identifiers may be created and/or displayed to a user.

Figure 11:
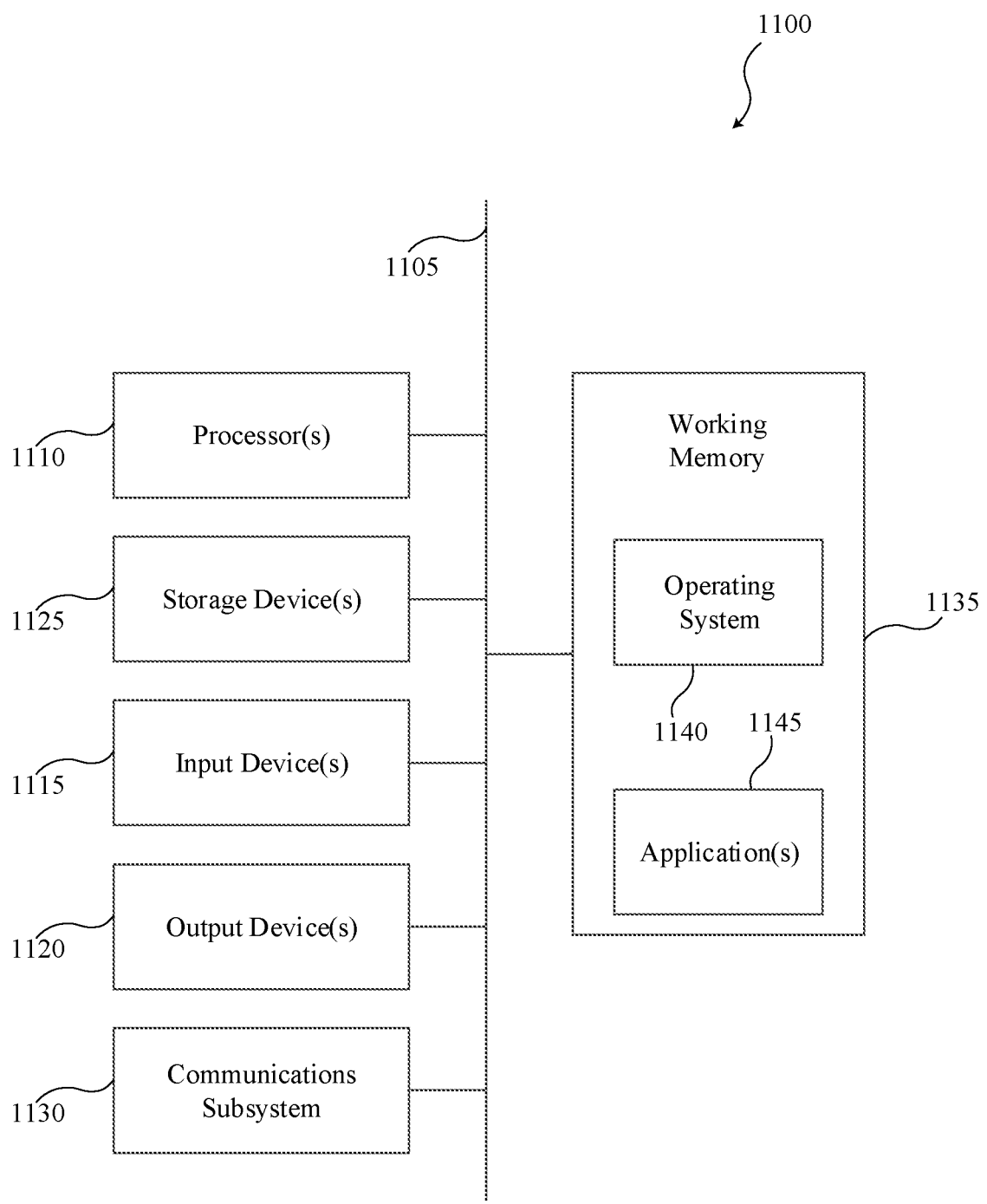
FIG. 11 is a block diagram of a computational system that can be used with or to perform some examples described in this document.

The computational system 1100, shown in FIG. 11 can be used to execute process 200 or any other process described within this document. As another example, computational system 1100 can perform any calculation, identification, matching, storing, processing, creating, displaying, providing, and/or determination described in this document. Computational system 1100 includes hardware elements that can be electrically coupled via a bus 1105 (or may otherwise be in communication, as appropriate). The hardware elements can include one or more processors 1110, including without limitation one or more general-purpose processors and/or one or more special-purpose processors (such as digital signal processing chips, graphics acceleration chips, and/or the like); one or more input devices 1115, which can include without limitation a mouse, a keyboard and/or the like; and one or more output devices 1120, which can include without limitation a display device, a printer and/or the like.

The computational system 1100 may further include (and/or be in communication with) one or more storage devices 1125, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The 1 computational system 1100 might also include a communications subsystem 1130, which can include without limitation a modem, a network card (wireless or wired), an infrared communication device, a wireless communication device and/or chipset (such as a Bluetooth device, an 802.6 device, a Wi-Fi device, cellular communication facilities, etc.), and/or the like. The communications subsystem 1130 may permit data to be exchanged with a network (such as the network described below, to name one example), and/or any other devices described in this document. In many embodiments, the computational system 1100 will further include a working memory 1135, which can include a RAM or ROM device, as described above.

The computational system 1100 also can include software elements, shown as being currently located within the working memory 1135, including an operating system 1140 and/or other code, such as one or more application programs 1145, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer).

A set of these instructions and/or codes might be stored on a computer-readable storage medium, such as the storage device(s) 1125 described above.

In some cases, the storage medium might be incorporated within the computational system 1100 or in communication with the computational system 1100. In other embodiments, the storage medium might be separate from a computational system 1100 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1100 and/or might take the form of source and/or installable code, which, upon compilation and/or installation on the computational system 1100 (e.g., using any of a variety of generally available compilers, installation programs, compression/decompression utilities, etc.) then takes the form of executable code.

Figure 10:
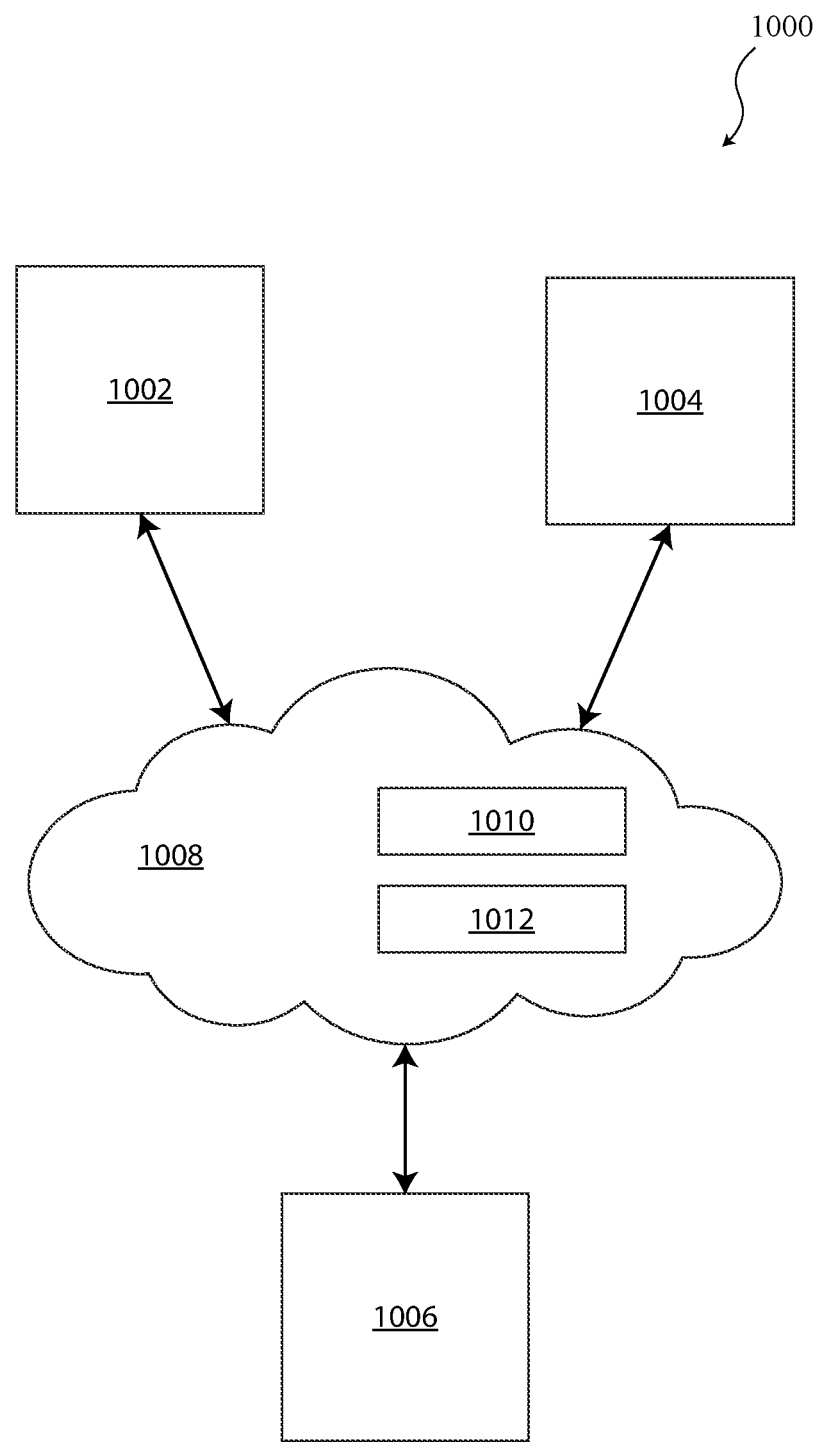
FIG. 10 illustrates an example cloud computing system.

FIG. 10 illustrates an example cloud computing system 1000. The cloud computing system 1000, for example, includes clients 1002, 1004, and 1006 connected to a computing cloud 1008. The computing cloud 1008, for example, includes processing unit 1010 and data storage unit 1012, both of which are accessible to clients 1002, 1004, and 1006.

The computing cloud 1008, the clients 1002, 1004, and 1006, and/or the data storage unit 1012 may include one or more or all of the components of computational system 1000.

The computing cloud 1008, for example, may be'capable of both storing information and performing data functions on information. The computing cloud 1008 includes at least one computer that is accessible from a remote location. The computing cloud 1008, for example, may include a plurality of storage devices that will be referred to as collectively the data storage unit 1012, as well as a plurality of processing units that will be referred to collectively as the processing unit 1010. The computing cloud 1008, for example, may include hardware that is cost prohibitive to deploy and maintain at individual clients 1002, 1004, and 1006. The computing cloud 1008, for example, may include software that is cost prohibitive to install, deploy, and maintain at individual computing clouds. The computing cloud 1008 may, for example, may provide this hardware and software through secure connections to the clients 1002, 1004, and 1006. While there is one computing cloud 1008 shown in FIG. 10, it is explicitly understood that a plurality of clouds may be consistent with this disclosure. It is understood that the disclosed historian system can collect, store, and retrieve data for multiple clients, multiple systems within a single client, as well as multiple systems located within multiple clients.

The clients 1002, 1004, and 1006 may include individual computers, tablets, or mobile devices that are in communication with the computing cloud 1008. The clients 1002, 1004, and 1006 are capable of accessing both the processing unit 1010 and data storage unit 1012 that are located in the computing cloud 1008. The clients 1002, 1004, and 1006 are able to access both local processes as well as information from the computing cloud 1008. The clients 1002, 1004, and 1006 may comprise a plurality of manufacturing tools and sensors to monitor the manufacturing tools. These sensors may detect any operational condition of the manufacturing tools, including, but not limited to, the temperature, vibration, or other measurable operating parameter.

The clients 1002, 1004, and 1006 communicate with the computing cloud 1008 through any secured or unsecured method, including Hypertext Transfer Protocol Secure (HTTPS), secure telnet, or file transfer protocol secure (FTPS). Secure methods, for example, may be preferred over unsecure methods, and that the particular method chosen will depend upon the requirements of the function being accessed. This document should not be interpreted as being limited to any particular protocol or method of transferring data. Various other data transfer protocols may be used.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments: Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computing cloud for forensic criminal investigation comprising at least one data storage unit and at least one memory device configured to store instructions and at least one computer processing unit that executes the instructions, wherein the computing cloud:

provides an interactive webpage having at least a data management page and a storyboard page;

receives first personal data about a first subject via the data management page;

receives a first image via the data management page;

receives first text data associated with the first image via the data management page;

receives first time data associated with the first image via the data management page;

links the first time data and the first text data with the first image;

receives second text data via the data management page;

receives first location data via the data management page;

receives second time data via the data management page;

links the first location data and the second time data with the second text data;

receives a first plurality of digital records of interaction between a first identifier associated with the first subject and a first plurality of identifiers each associated with a respective one of a first plurality of individuals, the first plurality of digital records having been recorded by a first provider, each of the first plurality of digital records including a plurality of data elements;

receives a first map from a network location from the location data, the first map showing the first location and an area surrounding the first location, the first map having a graphical representation of the first location;

creates a plurality of story boards on the storyboard page, each storyboard of the plurality of storyboards comprising graphical and/or textual representations of data, the plurality of storyboards comprising:

a first storyboard that includes the first personal data, a reference to the first plurality of records, and a timeline, the timeline comprising a visual representation of the first time data and a visual representation of the second time data;

a second storyboard that includes the first image, the first text, the first time data, and the timeline; and a third storyboard that includes the second text, the second time location, the first map, and the timeline; and provides the storyboard on the interactive webpage in response to a request for the interactive webpage.

2. The computing cloud according to claim 1, wherein the first provider comprises a provider selected from the group consisting of a wireless communication provider, a social media company, and a messenger company.

3. The computing cloud according to claim 1, wherein the data management page comprises one or more pages.

4. The computing cloud according to claim 1, wherein the visual representation of the first time data includes a link to the second story board such that when clicked by a user viewing either the first story board or the third story board the second story board is presented to the user.

5. The computing cloud according to claim 4, wherein the computing cloud further receives second personal data about a second subject via the data management page; and wherein the plurality of storyboards comprises a fourth storyboard that includes the second personal data.

6. The computing cloud according to claim 5, wherein the computing cloud further receives a second plurality of digital records of interaction between a second identifier associated with the second subject and a second plurality of identifiers each associated with a respective one of a second plurality of individuals, the second plurality of digital records having been recorded by a second provider, each of the second plurality of digital records including a plurality of data elements;

wherein the fourth storyboard includes a reference to the second plurality of records.

7. The computing cloud according to claim 6, wherein the computing cloud further:

establishes a first digital interaction between the first subject and the second subject based on an interaction between the data element of the first plurality of digital records and the data element of the second plurality of digital records.

8. The computing cloud according to claim 1, wherein the computing cloud further:

receives changes to one or more of the first text data, the first time data, the first location data, the second text data, and the second time data; and automatically updates the plurality of storyboards based on the changes.

9. The computing cloud according to claim 1, wherein the computing cloud further:

receives third data via the data management page;
receives third time data via the data management page;
links the third data and the third time data together;
updates the timeline to include a representation of the third time data; and
updates the plurality of storyboards to include a fourth storyboard that includes a visual and/or textural representation of the third data.

10. The computing cloud according to claim 1, wherein the computing cloud further exports the plurality of storyboards as a standalone file, the standalone file comprising a file selected from the group consisting of a pdf file, an HTML file, and a power point file.

11. A method for producing a storyboard of a forensic case, the method comprising:

providing an interactive webpage having at least a data management page and a storyboard page;

receiving first personal data about a first subject via the data management page;

receiving a first image via the data management page;

receiving first text data associated with the first image via the data management page;

receiving first time data associated with the first image via the data management page;

linking the first time data and the first text data with the first image;

receiving second text data via the data management page;

receiving first location data via the data management page;

receiving second time data via the data management page;

linking the first location data and the second time data with the second text data;

receiving a first plurality of digital records of interaction between a first identifier associated with the first subject and a first plurality of identifiers each associated with a respective one of a first plurality of individuals, the first plurality of digital records having been recorded by a first provider, each of the first plurality of digital records including a plurality of data elements;

retrieving a first map from a network location from the location data, the first map showing the first location and an area surrounding the first location, the first map having a graphical representation of the first location;

creating a plurality of story boards on the storyboard page, each storyboard of the plurality of storyboards comprising graphical and/or textual representations of data, the plurality of storyboards comprising:

a first storyboard that includes the first personal data, a reference to the first plurality of records, and a timeline, the timeline comprising a visual representation of the first time data and a visual representation of the second time data;

a second storyboard that includes the first image, the first text, the first time data, and the timeline; and a third storyboard that includes the second text, the second time location, the first map, and the timeline; and providing the storyboard on the interactive webpage in response to a request for the interactive webpage.

12. The method according to claim 11, wherein the first provider comprises a provider selected from the group consisting of a wireless communication provider, a social media company, and a messenger company.

13. The method according to claim 11, wherein the data management page comprises one or more pages.

14. The method according to claim 11, wherein the visual representation of the first time data includes a link to the second story board such that when clicked by a user viewing either the first story board or the third story board the second story board is presented to the user.

15. The method according to claim 11, further comprising receiving second personal data about a second subject via the data management page;

wherein the plurality of storyboards comprises a fourth storyboard that includes the second personal data.

16. The method according to claim 15, further comprising receiving a second plurality of digital records of interaction between a second identifier associated with the second subject and a second plurality of identifiers each associated with a respective one of a second plurality of individuals, the second plurality of digital records having been recorded by a second provider, each of the second plurality of digital records including a plurality of data elements;
    wherein the fourth storyboard includes a reference to the second plurality of records.

17. The method according to claim 16, further comprising:
    establishing a first digital interaction between the first subject and the second subject based on an interaction between the data element of the first plurality of digital records and the data element of the second plurality of digital records.

18. The method according to claim 11, further comprising:
    receiving changes to one or more of the first text data, the first time data, the first location data, the second text data, and the second time data; and
    automatically updating the plurality of storyboards based on the changes.

19. The method according to claim 11, further comprising:
    receiving third data via the data management page;
    receiving third time data via the data management page;
    linking the third data and the third time data together;
    updating the timeline to include a representation of the third time data; and
    updating the plurality of storyboards to include a fourth storyboard that includes a visual and/or textural representation of the third data.

20. The method according to claim 11, further comprising exporting the plurality of storyboards as a standalone file, the standalone file comprising a file selected from the group consisting of a pdf file, an HTML file, and a power point file.

21. A computing cloud for forensic criminal investigation comprising at least one data storage unit and at least one memory device configured to store instructions and at least one computer processing unit that executes the instructions, wherein the computing cloud:
    provides an interactive webpage;
    receives via the interactive webpage a first plurality of digital records of interaction between a first identifier associated with a first individual and a first plurality of identifiers each associated with a respective one of a first plurality of individuals, the first plurality of digital records having been recorded by a first provider, each of the first plurality of digital records including a plurality of data elements;
    receives via the interactive webpage personal data about the first individual;
    receives via the interactive webpage one or more data files associated with the first individual, the one or more data files selected from the group consisting of an image, text, video, audio, and GPS data;
    creates a case by linking together the personal data about the first individual, the first plurality of digital records of interactions, and the one or more data files in a case database;
    creates a plurality of case slides from the case, wherein each of the plurality of case slides include a graphical representation of the case; and
    modifies the interactive webpage to present the case slides.

22. The computing cloud according to claim 21, wherein the computing cloud further exports the case slides as a standalone file, the standalone file comprising a file selected from the group consisting of a pdf file, an HTML file, and a power point file.

23. The computing cloud according to claim 21, wherein the plurality of case slides comprises:
    a first slide including a visual representation of the personal data about the first individual;
    a second slide including a visual representation of data within he one or more data files; and
    a third slide including a visual representation of the first plurality of digital records of interaction.

24. The computing cloud according to claim 21, wherein each of the first plurality of digital records of interaction include a timestamp and the one or more data files include a timestamp; and wherein each of the plurality of case slides are organized chronologically based on the timestamps.

25. The computing cloud according to claim 21, wherein the computing cloud further:
    receives via the interactive webpage a second plurality of digital records of interaction between a second identifier associated with a second individual and a second plurality of identifiers each associated with a respective one of a second plurality of individuals, the second plurality of digital records having been recorded by a second provider, each of the second plurality of digital records including a plurality of data elements;
    wherein creating the case comprises linking together the personal data about the first individual, the first plurality of digital records of interactions, the second plurality of digital records of interactions, and the one or more data files in a case database.

26. The computing cloud according to claim 25, wherein the plurality of case slides comprises:
    a third slide including a visual representation of the first plurality of digital records of interaction; and
    a fourth slide including a visual representation of the second plurality of digital records of interaction.

27. The computing cloud according to claim 25, wherein the plurality of data elements of the first plurality of digital records are different than the plurality of data elements of the second plurality of digital records.

28. The computing cloud according to claim 25, wherein the first provider comprises a first mobile phone carrier and the second provider comprises a second mobile phone carrier.

29. The computing cloud according to claim 25, wherein the first provider comprises a mobile phone carrier and the second provider comprises a social media company.

30. The computing cloud according to claim 25, wherein the first provider comprises a mobile phone carrier and the second provider comprises a messaging company.

31. The computing cloud according to claim 21, wherein the first plurality of digital records comprises mobile phone records, license plate data, GPS tracking data, emails, and messages.

32. A method for producing a storyboard of a forensic case, the method comprising:
    providing an interactive webpage;
    receiving via the interactive webpage a first plurality of digital records of interaction between a first identifier associated with a first individual and a first plurality of identifiers each associated with a respective one of a first plurality of individuals, the first plurality of digital records having been recorded by a first provider, each of the first plurality of digital records including a plurality of data elements;

receiving via the interactive webpage personal data about the first individual;

receiving via the interactive webpage a plurality of data files associated with the first individual, the one or more data files selected from the group consisting of an image, text, video, audio, a map, and GPS data;

creating a case database by linking together the personal data about the first individual, the first plurality of digital records of interactions, and the one or more data files in a case database;

creating a plurality of case slides from the case database, wherein each of the plurality of case slides include a graphical representation of the case; and modifying the interactive webpage to present the case slides.

33. The method according to claim 32, further comprising exporting the case slides as a standalone file, the standalone file comprising a file selected from the group consisting of a pdf file, an HTML file, and a power point file.

34. The method according to claim 32, wherein the plurality of case slides comprises:
 a first slide including a visual representation of the personal data about the first individual;
 a second slide including a visual representation of data within he one or more data files; and
 a third slide including a visual representation of the first plurality of digital records of interaction.

35. The method according to claim 32, further comprising:
 receiving via the interactive webpage a second plurality of digital records of interaction between a second identifier associated with a second individual and a second plurality of identifiers each associated with a respective one of a second plurality of individuals, the second plurality of digital records having been recorded by a second provider, each of the second plurality of digital records including a plurality of data elements;
 wherein creating the case comprises linking together the personal data about the first individual, the first plurality of digital records of interactions, the second plurality of digital records of interactions, and the one or more data files in a case database.

36. The method according to claim 35, wherein the plurality of case slides comprises:
 a third slide including a visual representation of the first plurality of digital records of interaction; and
 a fourth slide including a visual representation of the second plurality of digital records of interaction.

37. The method according to claim 35, wherein the plurality of data elements of the first plurality of digital records are different than the plurality of data elements of the second plurality of digital records.

38. The method according to claim 35, wherein the first provider comprises a first mobile phone carrier and the second provider comprises a second mobile phone carrier.

39. The method according to claim 35, wherein the first provider comprises a mobile phone carrier and the second provider comprises a social media company.

40. The method according to claim 35, wherein the first provider comprises a mobile phone carrier and the second provider comprises a messaging company.

41. The method according to claim 32, wherein the first plurality of digital records comprises mobile phone records, license plate data, GPS tracking data, emails, and messages.

* * * * *